UNITED STATES PATENT OFFICE.

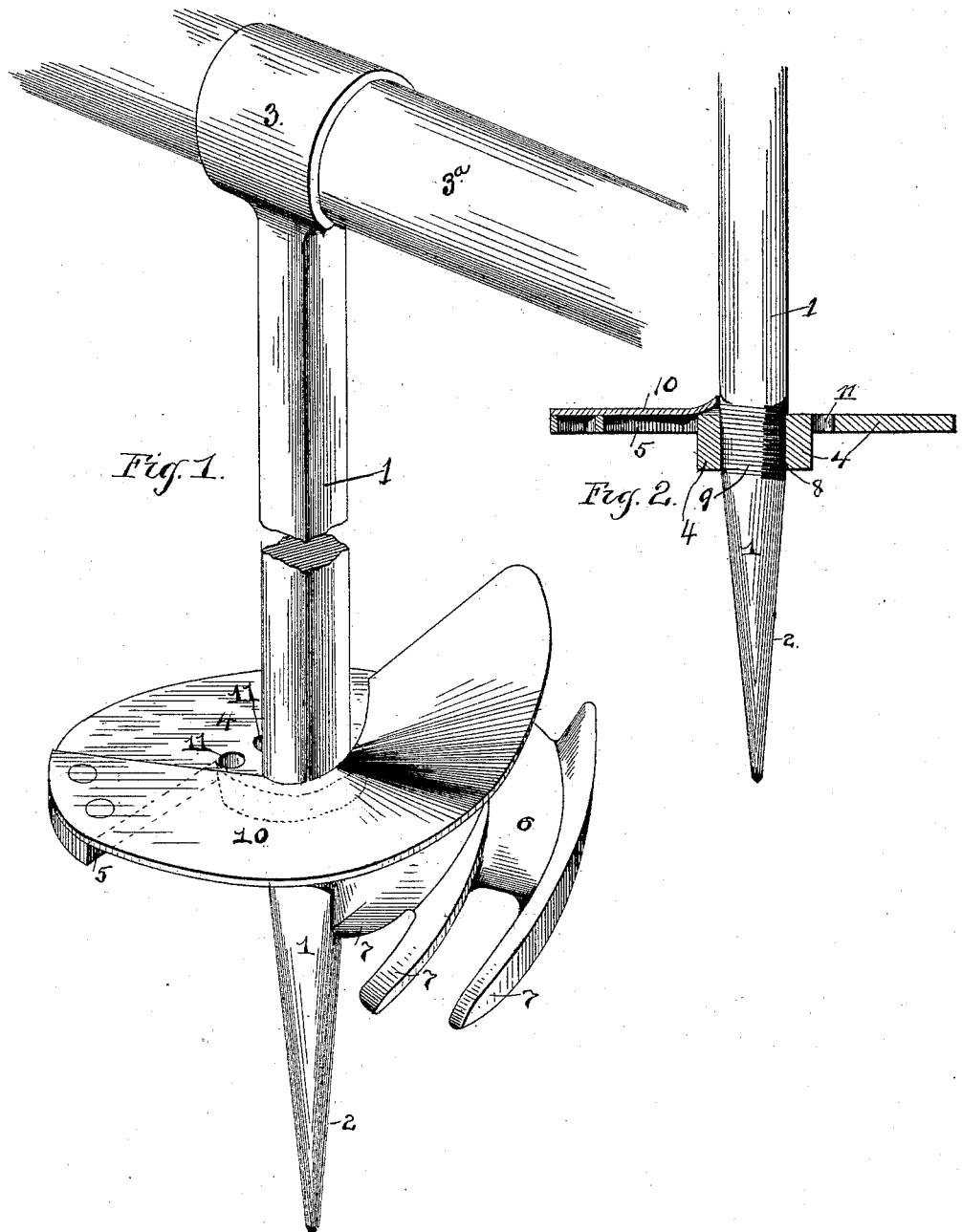

WILLIAM H. TYLER, OF DAVID CITY, NEBRASKA.

EARTH-AUGER.

SPECIFICATION forming part of Letters Patent No. 469,427, dated February 23, 1892.

Application filed June 6, 1891. Serial No. 395,348. (No model.)

*To all whom it may concern:*

Be it known that I, WILLIAM H. TYLER, a citizen of the United States, residing at David City, in the county of Butler and State of Nebraska, have invented a new and useful Earth-Auger, of which the following is a specification.

The invention relates to improvements in earth-augers.

The object of the present invention is to simplify and improve the construction of earth-augers for digging post-holes and the like, and to increase their efficiency and enable them to be operated with great ease and at the expense of a small amount of labor on the part of the operator.

The invention consists in the construction and novel combination and arrangement of parts hereinafter fully described, illustrated in the accompanying drawings, and particularly pointed out in the claim hereto appended.

In the drawings, Figure 1 is a perspective view of an earth-auger constructed in accordance with this invention. Fig. 2 is a longitudinal sectional view.

Referring to the accompanying drawings, 1 designates a metal stock provided at its lower end with a point 2 and at its upper end with a socket 3, adapted to receive a handle 3ª. The stock 1 is squared above the boring-disk 4, which is arranged at the upper end of the point 2, and by employing a squared stock a hole or opening is made through the loose earth above the boring-disk to admit air when the auger is being raised to clear the hole and remove the loose earth, and all suction is prevented, thereby making it much easier to remove the earth. The metallic boring-plate 4 is a disk having a peripheral opening, and the edge 5 of the opening is straight, and the edge 6 is curved downward spirally and is provided with cutting-tines 7, and the boring disk or plate 4 has a central threaded opening 8 to receive the threaded portion 9 of the stock, whereby the disk is secured to the same.

Secured to the straight edge 5 of the disk or plate 4 is a spirally-disposed spring-plate 10, which is arranged above the opening of the disk or plate and is approximately parallel with the spiral portion of the plate or disk and forms therewith an opening for the passage of the earth severed by the tines 7. The spring-plate 10 supports the loose earth and prevents the opening of the plate becoming filled and clogged, and carries the loose earth back of the cutting-tines to the level portion of the disk and greatly increases the ease of operation over that class of earth-augers in which a hinged plate is employed to serve as a valve to close the opening of the boring disk or plate. In this latter class of devices the loose earth bears upon the hinged plate and considerable force must be exerted to cause the earth being severed to pass through the opening of the disk or plate. The spring-plate 10 may be arranged to increase or diminish the mouth or passage of the auger to limit the cut of the tines, and should a stone or hard lump get in the mouth or opening the plate will spring sufficiently to permit the passage thereof and the operation of the auger will not be obstructed. Openings 11 are provided in the plate or disk to permit the passage of air when the auger is being raised to clean the hole, and the air passing through the openings 11 will get beneath the auger and will prevent suction and make it much easier to lift the auger and loose earth out of the hole.

What I claim is—

An auger comprising the squared stock, the disk or plate secured to the stock and having an opening provided with a straight edge 5 and a downwardly-bent and spirally-curved edge 6, provided with tines, and having air-openings 11, and the spring-plate rigidly secured to the straight edge 5 and having a curved edge conforming to the peripheral curve of the disk or plate and being arranged over the opening of the same and forming, with the dowardly-curved and spirally-disposed portion, an opening or mouth to permit the passage of earth severed by the tines, substantially as described.

In testimony that I claim the foregoing as my own I have hereto affixed my signature in presence of two witnesses.

WILLIAM H. TYLER.

Witnesses:
J. R. CROCKER,
I. T. McCASKEY.